United States Patent

[11] 3,604,108

| [72] | Inventor | Paul Mallery<br>Murray Hill, N.J. |
|---|---|---|
| [21] | Appl. No. | 864,367 |
| [22] | Filed | Oct. 7, 1969 |
| [45] | Patented | Sept. 14, 1971 |
| [73] | Assignee | Bell Telephone Laboratories, Incorporated<br>Murray Hill, Berkeley Heights, N.J. |

[54] METHOD FOR HANDLING, TESTING AND BONDING OF BEAM-LEADED DEVICES
6 Claims, 7 Drawing Figs.

[52] U.S. Cl. .................................................. 29/593,
219/80, 219/85, 219/158
[51] Int. Cl. ............................................. G01r 3/00
[50] Field of Search .......................................... 219/80, 85,
121 EB, 121 L, 158; 29/593, 407, 574

[56] References Cited
UNITED STATES PATENTS
3,083,291 3/1963 Soffa et al. .................... 219/85 X

| 3,230,338 | 1/1966 | Kawecki...................... | 219/85 |
| 3,271,555 | 9/1966 | Hirshon et al. ............... | 219/85 |
| 3,333,274 | 7/1967 | Forrier ........................ | 346/33 |
| 3,337,941 | 8/1967 | Drop ........................... | 219/158 X |
| 3,534,462 | 10/1970 | Cruicksthank et al. ........ | 219/121 L X |

*Primary Examiner*—J. V. Truhe
*Assistant Examiner*—Hugh D. Jaeger
*Attorneys*—R. J. Guenther and Edwin B. Cave ABSTRACT: Beam-leaded devices are handles at and after a test stage by a precision movement system requiring only a single pickup of each device from its position as received. A pickup tool is brought in contact with the beam leads of successive devices and pulse-heated to melt the carrier wax and effect a tack bond of the head and leads. Without disturbing the device alignment, the head transfers the device to a prepositioned test station where full dynamic testing occurs. Thereafter, the head moves the device to a carrier, a substrate for bonding or a discard bin.

PATENTED SEP 14 1971　　3,604,108

INVENTOR
*P. MALLERY*
BY Charles E. Graves

ATTORNEY

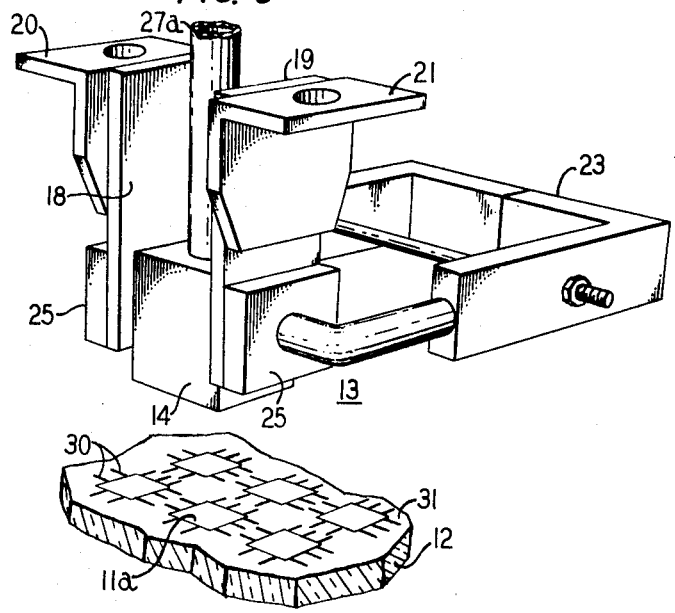
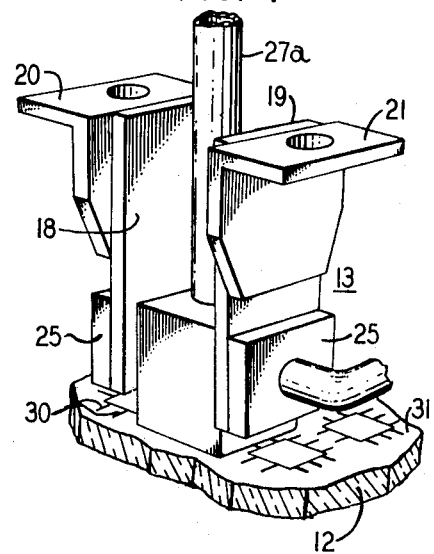
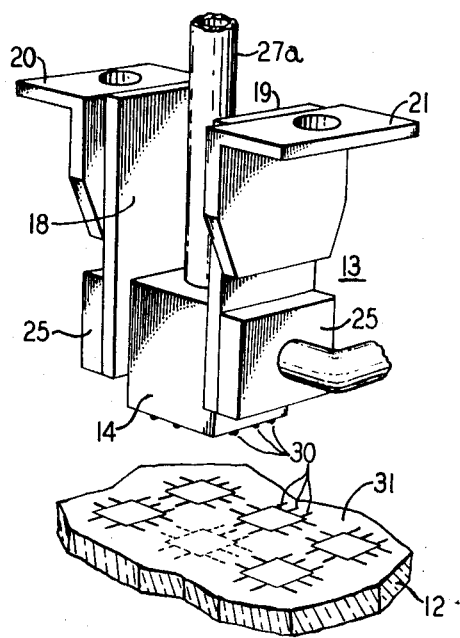

METHOD FOR HANDLING, TESTING AND BONDING OF BEAM-LEADED DEVICES

FIELD OF THE INVENTION

This relates in general to manufacture of beam-leaded integrated circuit devices; and in particular, to the handling of such devices for testing and bonding.

BACKGROUND OF THE INVENTION

Following their fabrication and etch-apart, beam-leaded devices are typically received at a testing station disposed in wax on a sapphire disc, with the beam leads arranged in an X-Z configuration and the devices having a fixed center-to-center spacing. Each device is electrically tested and thereafter forwarded to a further location for storage or preparatory to bonding; or discarded if found unsatisfactory.

Numerous systems for facilitating device handling at this stage have been proposed. The handling time and device yield rate for this stage have nevertheless remained unsatisfactory. One problem is that previous systems, insofar as is known, typically require a transfer of each device from its mounting wax to a carrier prior to testing and thereafter to a test pad. Device alignment is often disturbed; and to avoid incorrect test results, it is necessary to realign each device before testing. In other instances, electrical back-probing of the devices with needle probes is attempted while they are still disposed in the wax. Too frequently, however, the needles cause the beam leads to yield laterally and thus destroy the close tolerances needed for later bonding.

Another problem in many systems is that the pickup tools are not versatile enough to test and bond in one sequence with reliable, accurate positioning of the device at each step. Some present compliant pickup tools, for example, cannot bond a device to a substrate and can only tack-bond if the substrate is elevated in temperature.

Accordingly, the following are the invention's principal objects:

to reduce the time and cost required for testing beam-leaded devices;

to increase the yield at the test and bond stages of beam-leaded device manufacture;

more specifically, to eliminate the need for alignment of individual devices prior to their being brought into contact with a test pad and even further, prior to their subsequent bonding into a circuit substrate;

to better protect the beam leads during the test and bond stages; and to eliminate the separate pickup operations for testing and bonding.

SUMMARY OF THE INVENTION

Pursuant to the invention, each device is picked up from its aligned position on a waxed sapphire disc by a handling tool that uses a combination of vacuum and bonding forces to secure the device. The tool is then indexed by precision-position mechanisms to a compliant test pad and thence to a substrate station where the device is bonded, or to a discard station where an airblast aids in releasing the device.

In one embodiment, the pickup head is a thermal pulse-heated, four-sided wedge made of titanium carbide. The wedge contacts all beam leads; and defines an interior chamber to accept the silicon body of the device. The pickup-assisting vacuum is drawn on this chamber. Where device discard is indicated a pulse of air under pressure is applied to the chamber to release the device beam leads.

A mounting wax is used that is liquid in the range of 100-300 C. The heating pulse is alternating current of the order of 100 amperes applied for approximately a second, bringing the head to a peak temperature of about 950° C. The resulting device temperature peak is, however, only about 300° C.

In operation, the device-carrying sapphire disc is aligned, by optical methods for example, with respect to a particular, preselected head movement. Specifically, the disc is aligned to bring the beam leads into the same X-Z sense as the pickup edges of the head. The head then is indexed to a position over a selected one of the devices, and lowered to bring its edges into contact with the beam leads under a predetermined downward force. A current pulse is applied through the head, heating the head which melts the wax beneath and around the device being picked up, and also effects a tack bond of the leads to the edges of the head. A vacuum of about 10 inches of HG also is drawn on the chamber to aid in pickup.

Thus acquired, the device is lifted from the wax, without any wax clinging to the body or leads and without altering the position of neighboring devices. The head is indexed to a test pad with leads conforming in geometry to the device beam leads. The pad is compliant in the vertical direction to accommodate possible elevation differences among the beam leads. A full range of dynamic tests are then automatically made to gauge the designed AC characteristics of the device.

After testing, the head is indexed to any one of several possible subsequent stations. The device can, for example, be directly bonded by bringing the head into position with respect to a circuit substrate, where a suitable further electrical pulse reheats the tool thus to effect a full bond. Alternately, the tool can be heated to effect a tack bond which later is augmented by compliant or other bonding techniques in a separate fixture. Or, if desired, the devices can be sequentially spaced by the head into wax on a carrier for storage.

A device may be reinserted into the wax and disengaged from the tool by reheating the tool and then allowing the carrier wax to solidify around the device before vertically indexing the head. Devices may be placed in regular patterns on either hard carriers or on carriers covered with a layer of soft, tacky material by pressing against the surface and removing the vacuum. This deposition is facilitated by introducing low gas pressure into the chamber of the tool. Devices may be discarded by application of a gas pressure burst to the chamber.

The invention and its further objects, features and advantages will be readily apprehended from a reading of the detailed description to follow of an illustrative embodiment.

BRIEF DESCRIPTION OF THE DRAWING

FIGS. 3, 4, and 5 are perspective schematic diagrams illustrating operating sequences for the head;

DETAILED DESCRIPTION OF ILLUSTRATIVE EMBODIMENT

Figure 1:
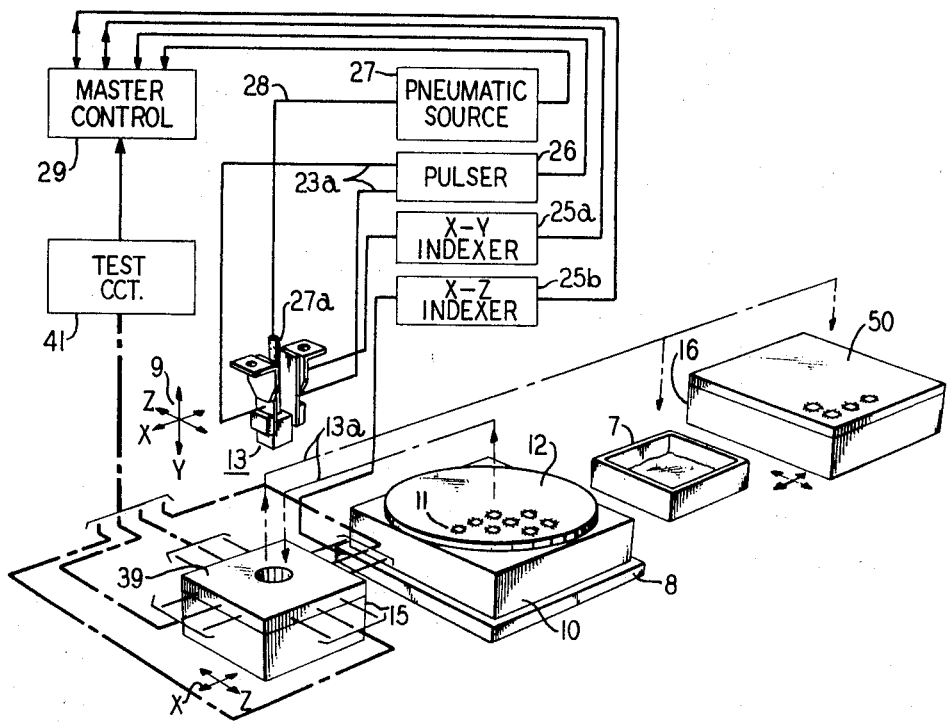
FIG. 1 is an isometric view showing an overall system embodying the invention.

In FIG. 1, at a pickup station 10, a large number of beam-leaded devices 11 are arrayed in a wax. Their alignment is established in the wax during the previous etch-apart step. The wax rests on a sapphire disc 12. A pickup tool 13 is mounted for precision movement to and from fixed, preselected points of the X-Y plane of the fixed coordinate system denoted 9. Said movement is denoted by the paths 13a. The pickup station 10 is mounted on a step-and-repeat table 8, whose position is controllable in the X-Z plane. Thus, suitable indexing of the table 8 brings successive ones of the devices 11 into coincidence with the fixed pickup point defined for the tool 13.

A test fixture 15, also positionable in the X-Z plane by means (not shown) similar to table 8, for example, is normally fixedly located with its test pad in coincidence with the fixed test point defined for the tool 13. Further, station 16 represents a substrate bonding station or, alternatively, a storage carrier; and is also positionable in the X–Z plane to enable the tool 13 to coincide with bonding points or to array the devices on a carrier in a desired X–Z array. Devices rejected by fixture 15 are segregated, as by placement in reject bin 7.

The positioning of devices 11 in the wax on disc 12 typically follows a center-to-center spacing of about 0.070 inch, the exact spacing depending upon the size of the device and the spacing between devices. Hence, an initial orientation of the entire disc 12 within the X–Z plane followed by a step-and-repeat indexing of table 8 enables the tool to pick up successive devices for their individual testing and later disposition. In all instances, only one pickup by the head of a device is necessary; and given proper positioning of the sapphire disc 12 at the outset, no individual device alignment thereafter is necessary.

PICKUP HEAD STRUCTURE

Figure 2:
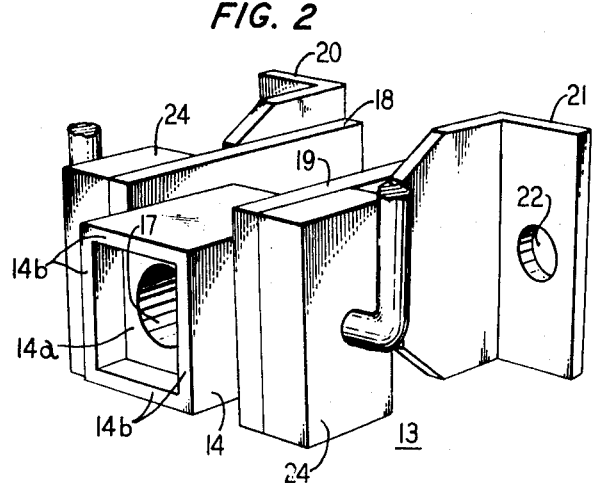
FIG. 2 is a side perspective diagram illustrating features of the inventive pickup head.

The tool 13, as depicted in FIG. 2 comprises a block-shaped head 14 having an interior chamber 14a defined by exterior edges 14b. A typical width of an edge 14b is 5 mils; and each edge typically is 0.067 inch on a side, these dimensions being dictated by the beam-leaded device size. An orifice 17 opening into the chamber 14a connects to a pneumatic line 27a.

The head 14 is supported by weldment to platinum strips 18, 19. The strips 18, 19 in turn are welded to mounting ears 20, 21 which advantageously are of nickel and make ohmic contact with said ears. A fastening hole 22 in each mounting ear 20, 21 serves to affix the tool 13 to a precision movement system denoted by indexer 25a and 25b in FIG. 1. Blocks 24 respectively flanking strips 18 and 19 are heat-insulating pads through which mechanical pressure is applied by clamp 23 to press strips 18 and 19 against head 14. Electrical current is passed to head 14 via platinum strips 18 and 19, wires 23a and pulser 26.

The head 14, pursuant to one facet of the invention, is required to be electrically insulative at its exterior surfaces such as edges 14b, in order not to interfere with electrical testing of devices supported by the tool. At the same time, the head 14 must be a bulk conductor capable of heating rapidly on the application of current pulses.

In his preferred embodiment, accordingly, applicant fashions head 14 of titanium carbide, the exterior of which has been oxidized to a depth in the angstrom unit range. The titanium dioxide film provides the desired insulation layer, exhibiting a working breakdown voltage of 100 volts. Additionally, DC resistance between the tool and the beam leads is at least 30 megohms, and capacitance between the tool and a 2-mil-wide beam lead is about 0.17 pF at 100 MHz.

The bulk titanium carbide is directly contacted by the strips 18, 19 which conduct the current pulses for heating. The oxide layer at edges 14b readily effects a tack bond to the device beam leads. The choice of titanium carbide thus is advantageous because of its resistance to high temperatures; its readiness to accept a tenacious surface oxide layer which tack bonds to gold, and its bulk conductivity enabling it to be quickly heated.

Returning to FIG. 1, the system advantageously comprises in addition to indexer 25a, an indexer 25b, pulser 26, a pneumatic source 27, a test circuit 41, and a master control 29. The indexer 25a on instruction from control 29 sequentially moves the tool 13 to several specified X–Y coordinates in the course of a testing cycle. Indexer 25b also sequentially positions table 8 as earlier described. The pulser 26, pneumatic source 27 and test circuit 28 are also connected to, and are under the control of, control 29.

FIGS. 3, 4 and 5 depict the picking up by the head 14 of a beam-leaded device. In FIG. 3, table 8 is indexed to the pickup position of head 14, and the head then is lowered until its edges 14b contact the beam leads 30 of a particular device 11a. The force of the tool against the leads is approximately 500 grams, for example, At this stage, the wax 31 in which the device 11a is embedded is in its solid state. With the head edges 14b in contact as in FIG. 4, an electrical pulse of approximately 100 amperes is applied by pulser 26 through the head for a duration of about 1 second to heat the head. The wax beneath and around the head melts, while concurrently a tack bond is effected between the edges 14b and some or all of the beam leads 30. During this period, a vacuum from source 27 is applied to chamber 14a through line 27a, the vacuum amounting to approximately 10 inches of Hg.

After the bonds to the leads are made and while the wax is still molten, the pickup head is indexed vertically, as in FIG. 5, drawing with it the beam-leaded device 11a. The electrical heating pulse may be removed before the wax is molten as the hot tool will supply the heat necessary to melt the wax.

Since in the present invention the head is only intermittently heated, less thermal energy is generated then in systems using continuously heated heads. In consequence, device temperatures stay well below levels as, for example, the gold-silicon eutectic point of 380° C., where damage could occur. For example, peak head temperatures at the level of 1,000° C. have been measured, but concurrent device temperatures not in excess of about 300° C. were recorded.

Figure 6:
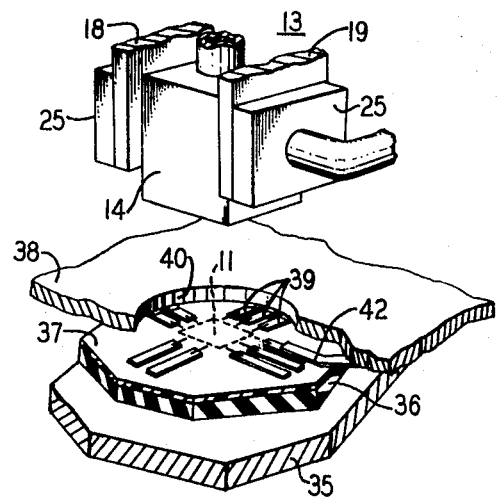
FIG. 6 is a frontal perspective view of a test fixture.

The test fixture 15 is detailed in FIG. 6 and consists of a pressure plate 35 on top of which is located resilient pad 36. Atop the resilient pad is a material layer 37 which serves the purpose of supporting gold-plated copper conductors 39 in precise alignment so as to contact the leads of the device 11 when it is lowered by tool 14. An alumina substrate 38 above the layer 37 incorporates gold conductors 42, which extend to the test orifice 40 in the substrate 38 and connect ultimately to test circuit 28. The conductors 42 on substrate 38 make ohmic contact with conductors 39 on the layer 37 by the pressure supplied by resilient pad 36.

A device to be tested is lowered through the orifice 40 and into contact with the conductors 39 whereupon the tests are performed and the results dispatched to control 29.

Device pickup and testing can, pursuant to the invention as thus far described, be accomplished within about 5 seconds per device; still less in many instances. One hundred percent testing of all devices can thus be substituted for the back probing widely used heretofore. A device not passing electrical tests is readily blown off the handling tool by indexing the tool 13 to the reject bin 7 and applying a pneumatic pulse of approximately 20 p.s.i. through the head orifice 17. Devices passing the electrical test are attached in their final position on a substrate such as 50 at the mounting station 16. Alternatively, the passed devices are deposited onto a carrier such as a glass covered with an appropriate soft material, one example of which is SYLGARD, a wax product of the Dow Corning Company.

When the device is brought for bonding down into contact with a substrate such as 50, the head 14 is pulse-heated to form either a tack bond or a final bond. In either case, advantageously, the substrate remains at ambient temperature. If the handling tool is to achieve final bond, a suitable form of force compensation must be provided, such as rocking the tool to contact the beam leads essentially one at a time.

Figure 7:
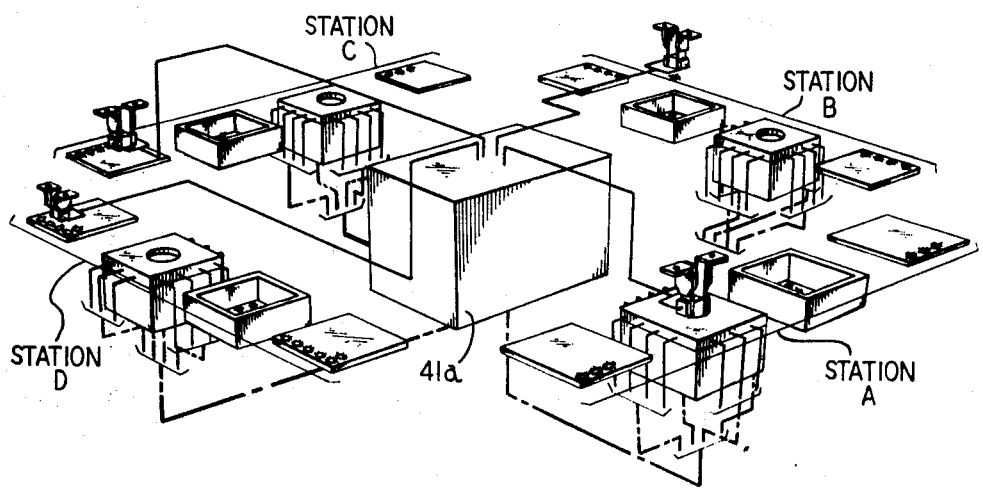
FIG. 7 is a schematic perspective diagram of an alternate inventive embodiment.

FIG. 7 depicts a possible production line arrangement using the present invention, consisting of of four stations denoted A, B, C, and D, each coupled into a common test circuit 41a. Each of the stations A through D may be substantially identical to that depicted in FIG. 1. The stations time-share the test circuit 41a in accordance with any suitable time-sharing technique.

It is to be understood that the embodiments described herein are merely illustrative of the principles of the invention. Various modifications may be made thereto by persons skilled in the art without departing from the spirit and scope of the invention.

What is claimed is:

1. Handling method for the test stage in beam-leaded device manufacture in which the devices as received are arrayed in wax on a substrate with said leads oriented in an X–Z sense, comprising the steps of:

positioning successive said devices at a first fixed point in an X–Z plane by suitably orienting in an X–Z sense said substrate and then periodically indexing same, acquiring said device at said first point by pulse-heating a pickup head to effect a light tack bond to said leads and also vacuum-holding said device to said head, moving said head in an X–Y plane from said first point to a test station comprising a compliant pad disposed at a second fixed point and having X–Z oriented test leads, and after testing, moving said head to a selected further point.

2. Handling method as per claim 1, wherein said further point is a discard bin, and comprising the further step of applying a gas blast from said head to aid in disengaging said device.

3. Handling method as per claim 1, wherein said further point is a storage carrier indexable in an X–Z plane, and comprising the further steps of indexing said carrier to coincide a selected region thereof with said further point, and depositing said device onto said region from said head.

4. Handling method as per claim 1, wherein said further point is a bonding station for affixing said successive devices to circuit substrates.

5. Handling method as per claim 1, wherein said acquiring step is effected with a pickup head comprising a chambered block with rectilinear pickup edges and having bulk electrical conductivity with said edges being electrically insulative.

6. Handling method as per claim 5, wherein said head comprises titanium carbide with said edges comprising an exterior film of titanium dioxide.